United States Patent [19]
Yasuda et al.

[11] Patent Number: 5,594,647
[45] Date of Patent: Jan. 14, 1997

[54] APPARATUS FOR DETERMINING EMERGENCY CONDITIONS OF A VEHICLE

[75] Inventors: Shigekazu Yasuda; Hirofumi Okada, both of Niwa, Japan

[73] Assignee: Kabushiki Kaisha Tokai-Rika-Denki-Seisakusho, Niwa, Japan

[21] Appl. No.: 434,326

[22] Filed: May 2, 1995

Related U.S. Application Data

[63] Continuation of Ser. No. 111,553, Aug. 25, 1993, abandoned.

[30] Foreign Application Priority Data

Aug. 28, 1992 [JP] Japan ................................. 4-230056

[51] Int. Cl.$^6$ ................................................ B60R 21/32
[52] U.S. Cl. .................... 364/424.055; 280/735; 180/282; 307/10.1; 340/436
[58] Field of Search ...................... 364/424.05; 280/734, 280/735; 180/274, 282; 307/10.1; 340/436, 438, 669

[56] References Cited

U.S. PATENT DOCUMENTS

| | | | |
|---|---|---|---|
| 4,836,024 | 6/1989 | Woehrl et al. | 280/735 |
| 5,040,118 | 8/1991 | Diller | 340/436 |
| 5,157,268 | 10/1992 | Spies et al. | 280/735 |
| 5,173,614 | 12/1992 | Woehrl et al. | 180/282 |
| 5,182,459 | 1/1993 | Okano et al. | 340/438 |

*Primary Examiner*—Gary Chin
*Attorney, Agent, or Firm*—Oliff & Berridge

[57] ABSTRACT

An apparatus for determining emergency conditions of a vehicle including: an acceleration sensor which detects the acceleration of a vehicle and an operation-signal generating apparatus which establishes a signal level based on the signal outputted from the acceleration sensor in a circuit established in accordance with the kind of vehicle collision and which outputs a signal for actuating a passenger safety device when the established signal level exceeds a reference value which is predetermined according to the kind of vehicle collision. This allows the passenger safety device to be actuated at a suitable time according to vehicle collision.

20 Claims, 4 Drawing Sheets

APPARATUS FOR DETERMINING EMERGENCY CONDITIONS OF A VEHICLE

This is a continuation of application Ser. No. 08/111,553 filed Aug. 25, 1993, now abandoned.

BACKGROUND OF THE INVENTION

1. Field of the Invention

The present invention relates to an apparatus for determining emergency conditions of a vehicle, and particularly to an apparatus for determining emergency conditions of a vehicle, which detects a sudden impact of a vehicle and actuates a passenger safety device.

2. Description of the Related Art

Conventionally, an apparatus for determining emergency conditions of a vehicle has been employed in which, when it is determined that there is a need to protect a passenger by detecting a sudden impact on a vehicle, a signal is outputted which actuates a passenger safety device, such as the expansion of an air bag, for protecting a passenger.

As a method for detecting a sudden impact on a vehicle, one is known in which determination as to whether it is necessary to protect a passenger is done by detecting vehicle acceleration. In an apparatus for determining emergency conditions of a vehicle using this method, a signal is obtained by making it such that when a time integral of an output signal from an acceleration sensor located in a vehicle exceeds a predetermined value at the time of a vehicle collision, an expansion signal for expanding an air bag is outputted. The air bag is thereby expanded, so that a passenger can be protected at the time of a vehicle collision.

Thus, a time standard from the time of collision which is most suitable for expanding an air bag (hereinafter referred to as an air bag expansion time standard) is previously determined. The above-described predetermined value is set so that the expansion signal for expanding an air bag is outputted between an upper limit time and a lower limit time of the air bag expansion time standard.

However, an acceleration sensor provides output signals of different wave forms depending upon conditions of the vehicle collision. For example, when a vehicle collides head-on with another(hereinafter referred to as "time of a vehicle head-on collision"), an output signal of a short-time, high-G wave form (i.e., a high-frequency and high-amplitude wave form in which a large acceleration is applied in a short time) is provided. On the other hand, when one of the side surfaces of a vehicle has been hit by another vehicle (hereinafter referred to as "time of an off-set collision"), an output signal of a long-time, low-G wave form (i.e., a low-frequency and low-amplitude wave form in which a small acceleration is applied for a long time) is provided. Only by making an integration of this output signal from the acceleration sensor in a conventional manner to make a determination may cause the degree of freedom of determination to be decreased. As a result, it was not possible to make a determination, at the same time, of whether the air bag expansion time standard corresponding to the short-time, high-G wave form at the time of a vehicle head-on collision had been satisfied nor whether the air bag expansion time standard corresponding to the long-time, low-G wave form at the time of an off-set collision had been satisfied. Thus, a conventional apparatus for determining emergency conditions of a vehicle has not been able to correspond to inconsistent time standards, because the characteristics of the wave forms are different from each other.

On the other hand, since the acceleration sensor detects all areas of vehicle acceleration, such conventional apparatus for determining emergency conditions of a vehicle may erroneously judge that vehicle acceleration generated in a short time during running on a rough road is a vehicle collision. In order to solve this problem, an air bag is required which expands only at the time of a vehicle collision and not when running on a rough road or the like.

With the above-described facts in view, it is an object of the present invention to provide an apparatus for determining emergency conditions of a vehicle, which is capable of making a proper determination to actuate a passenger safety device at the most suitable time in a condition requiring the passenger safety device irrespective of the vehicle conditions or the conditions of a vehicle collision.

SUMMARY OF THE INVENTION

In accordance with a first aspect of the present invention, an apparatus for determining emergency conditions of a vehicle is provided, comprising: an acceleration sensor which detects an acceleration of a vehicle and outputs a signal; and an operation-signal generating means which establishes a signal level based on the signal outputted from the acceleration sensor in a circuit in accordance with the kind of vehicle collision and which outputs a signal for actuating a passenger safety device for protecting a passenger when the established signal level exceeds a reference value which is predetermined according to the kind of vehicle collision.

In the embodiment of the present invention, it is preferable that the operation-signal generating means comprises an integration circuit which integrates the signal outputted from the acceleration sensor and a comparison circuit which compares a signal from the integration circuit with the reference value, and that the operation-signal generating means outputs an expansion signal for expanding an air bag of an air-bag unit serving as a passenger safety device. According to the aforementioned arrangement of the present invention, it is possible to actuate the air-bag unit at a suitable time according to the kind of vehicle collision.

In accordance with another aspect of the present invention, an apparatus for determining emergency conditions of a vehicle is provided, comprising: an acceleration sensor which detects an acceleration of a vehicle and outputs a signal; a plurality of integration means each of which integrates the signal outputted from the acceleration sensor, based on different time constants according to the kind of vehicle collision; and a comparison means which outputs a signal for actuating a passenger safety device for protecting a passenger when a signal outputted from the integration means exceeds a reference value which is predetermined according to the kind of vehicle collision.

In the embodiment of the present invention, it is preferable that the plurality of integration means each comprises a low-pass filter whose amplification factor decreases at the frequency which is equal to or more than a predetermined frequency and that the comparison means comprises a plurality of comparison circuits each of which establishes the respective reference values which are predetermined according to the kind of vehicle collision. According to the aforementioned arrangement of the present invention, it is possible to actuate the passenger safety device at a suitable time according to the kind of vehicle collision.

According to one more aspect of the present invention, an apparatus for determining emergency conditions of a vehicle is provided, comprising: an acceleration sensor which detects an acceleration of a vehicle and outputs a signal; a plurality of integration means which integrates the signal outputted from the acceleration sensor based on different time constants according to the kind of vehicle collision and vehicle condition; a plurality of comparison means each of which corresponds to the respective one of the plurality of integration means, outputs a signal when the signal outputted from the associated integration means exceeds a reference value which is predetermined according to the kind of vehicle collision, and outputs no signal of the vehicle condition which is different from that at the time of collision; and logical add operation means which inputs the signals outputted from the plurality of comparison means and outputs them as those which actuate a passenger safety device for protecting a passenger.

In the embodiment of the present invention, it is preferable that the plurality of comparison means output signals when it is judged that the kind of vehicle collision was a head-on collision or that one of the side surfaces of a vehicle was hit by another vehicle and do not output signals when it is judged that the vehicle condition is different from a vehicle collision such as when a vehicle rises up due to a difference in the road level like a curb. The aforementioned arrangement of the present invention allows a passenger safety device to be actuated at a suitable time according to the kind of vehicle collision and vehicle condition.

The apparatus for determining emergency conditions of a vehicle according to the first aspect of the present invention includes an acceleration sensor which detects vehicle acceleration and outputs a signal. In an operation-signal generating means, a signal level is determined based on the signal outputted from the acceleration sensor in accordance with circuits which are set according to the kind of vehicle collision. When the established signal level exceeds a reference value which is previously determined according to the kind of vehicle collision, the operation-signal generating means also outputs a signal which actuates a passenger safety device for protecting a passenger, e.g., an expansion signal for expanding an air bag. Consequently, when a vehicle collision occurs, the passenger safety device can be actuated according to the kind of the collision.

The apparatus for determining emergency conditions of a vehicle according to the second aspect of the present invention includes a plurality of integration means, each of which integrates the signal outputted from the acceleration sensor based on different time constants according to the kind of vehicle collision. Each of the plurality of integration means may comprise a low-pass filter which decreases its amplification factor, for example, at the frequency which is equal to or more than a predetermined frequency. The plurality of integration means can amplify only a signal having a desired frequency, which is outputted from the acceleration sensor, i.e., a signal having the frequency which is equal to or less than a predetermined frequency among signals of which frequencies vary according to the kind of vehicle collision.

When the signal outputted from the integration means exceeds a reference value which is previously determined according to the kind of vehicle collision, a comparison means outputs a signal for actuating a passenger safety device for protecting a passenger. The comparison means may be provided, each of which corresponds to the above-described plurality of integration means respectively, and may make a concentrative comparison of the output signal and the reference value by means of a computing means such as a computer. Therefore, a signal obtained by integrating a signal which corresponds to the kind of vehicle collision by the integration means is discriminated based on the reference value which is previously determined according to the kind of vehicle collision in the comparison means. Then, the signal outputted from the comparison means can be provided as a signal for actuating the passenger safety device for protecting a passenger, e.g., an expansion signal for expanding an air bag.

BRIEF DESCRIPTION OF THE DRAWINGS

FIG. 2A illustrates a characteristic curve of a first integration circuit; and FIG. 2B is a characteristic curve of a second integration circuit.

DESCRIPTION OF THE PREFERRED EMBODIMENTS

Figure 1:
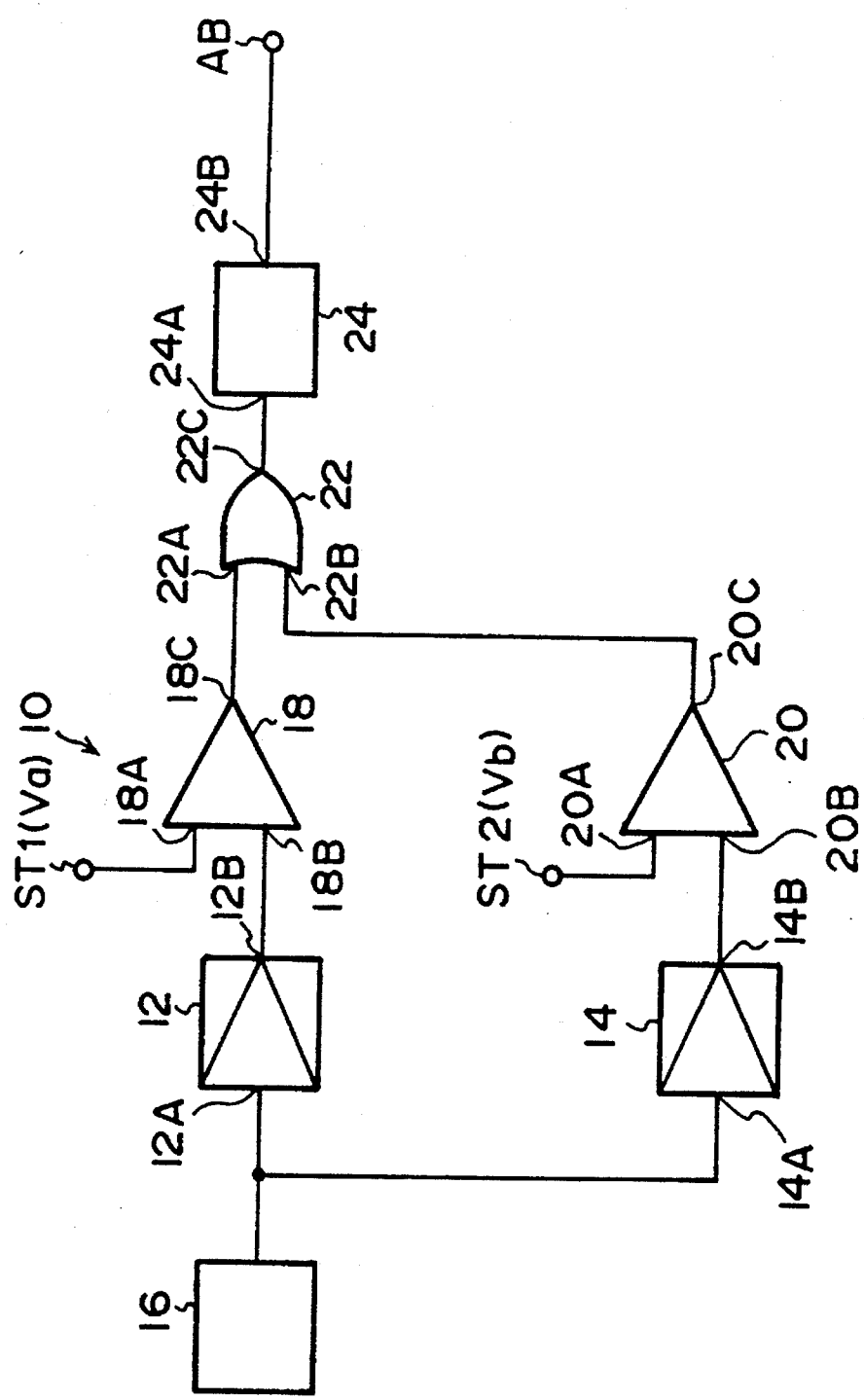
FIG. 1 is a block diagram illustrating a simplified configuration of a device for determining a vehicle collision according to the present invention.

Referring now to the drawings, an embodiment of the present invention will be explained hereinafter. This embodiment shows a passenger safety device for protecting a passenger, in which an apparatus for determining emergency conditions of a vehicle according to the present invention is applied to a device for determining a vehicle collision of an air bag system for expanding an air bag at the time of a vehicle collision.

Figure 3:
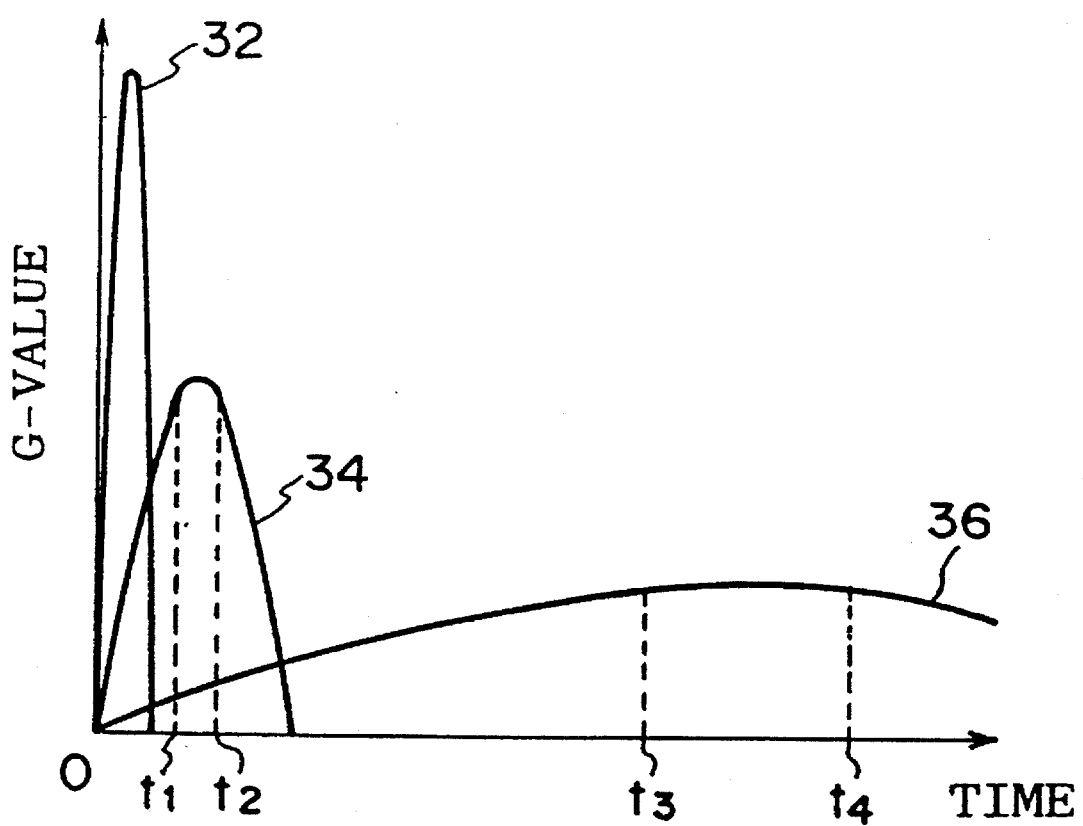
FIG. 3 is a characteristic curve illustrating an air bag expansion standard utilized for the present embodiment.

First, referring to FIG. 3, an air bag expansion standard utilized for the present invention is described herein. This air bag expansion standard shows the standard of an air-bag expansion time, in which an output signal from an acceleration sensor 16 (see FIG. 1) generated through a plurality of vehicle impact conditions is represented as a characteristic curve. In the present embodiment, the following three states of a vehicle by way of examples are shown: the state in which a vehicle rises up due to a difference in road level such as a curb; the state of a vehicle at the time of a head-on collision; and the state of a vehicle at the time of an off-set collision.

As illustrated in FIG. 3, each characteristic of the aforementioned plurality of vehicle states can be represented by the respective characteristic curves 32, 34 and 36: curve 32 corresponds to the state in which a vehicle rises up due to a difference in road level such as a curb; curve 34 corresponds to the state of a vehicle at the time of a head-on collision; and the curve 36 corresponds to the state of a vehicle at the time of an off-set collision. Among these curves, curve 32 shows the standard which does not expand an air bag since it does not show a characteristic of a vehicle collision. In the characteristic curve 34, time t1 and time t2 are respectively set to be a lower limit value and an upper limit value of the air bag expansion time standard. Similarly, in the characteristic curve 36, time t3 and time t4 are respectively set to be a lower limit value and an upper limit value of the air bag expansion time standard.

The air bag is expanded respectively between the lower limit time t1 and the upper limit time t2, and between the limit time t3 and the upper limit time t4 of each of the air-bag expansion time standards as shown in the characteristic curves 34 and 36, so that the expansion of an air bag can be achieved at the most suitable time.

FIG. 1 illustrates a block diagram of a simplified configuration of a device for determining a vehicle collision 10 according to the present embodiment.

The device for determining a vehicle collision 10 includes a first integration circuit 12 and a second integration circuit 14, each of whose input terminals 12A and 14A is respectively connected to an acceleration sensor 16 located in a vehicle (not shown). The first integration circuit 12 and the second integration circuit 14 each have a function equivalent to that of band-pass filters (low-pass filters) with the frequency characteristics which are different from each other (see FIG. 2).

Figure 2A:
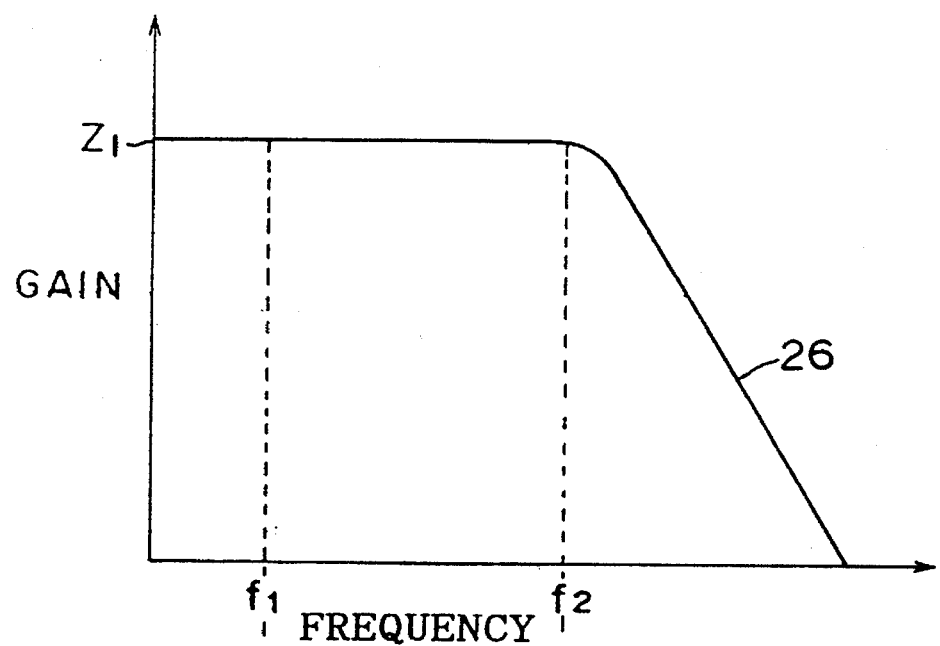
FIGS. 2A and 2B illustrate frequency characteristics of integration circuits of the device for determining a vehicle collision.

As illustrated in FIG. 2A, a characteristic curve 26 of the first integration circuit 12 has a gain of a predetermined value Z1 up to a cut-off frequency f2 and has a decreasing gain as the frequency increases when exceeding the cut-off frequency f2. This cut-off frequency f2 is previously established at a predetermined value to cut off signals which exceed the frequency of the output signals from the acceleration sensor 16 of the air bag expansion standard at the time of a head-on collision of a vehicle.

Figure 2B:
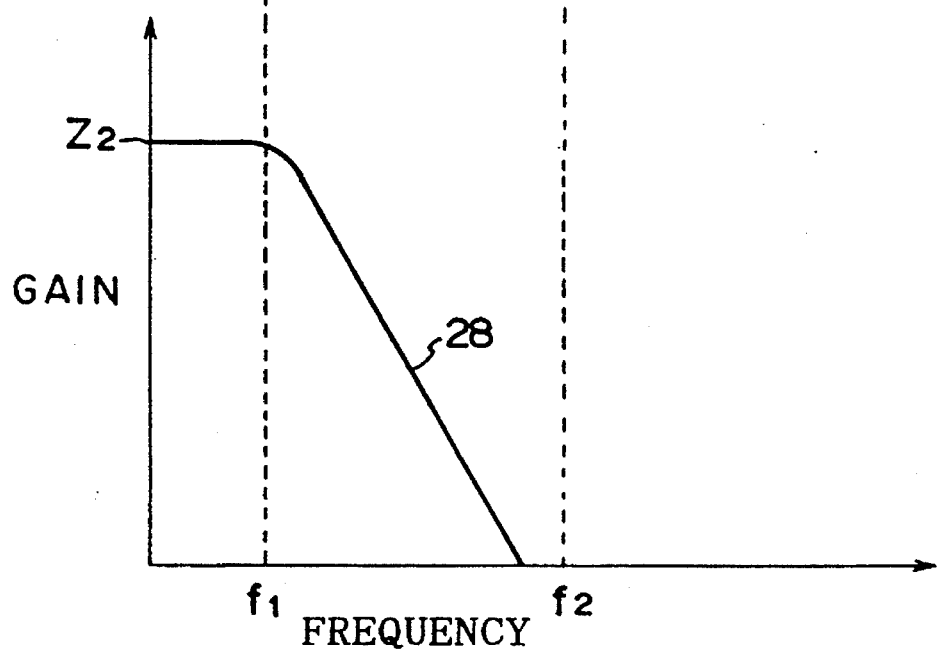

Further, as illustrated in FIG. 2B, a characteristic curve 28 of the second integration circuit 14 has a gain of a predetermined value Z2 up to a cut-off frequency f1 smaller than the aforementioned cut-off frequency f2 and has a decreasing gain as the frequency increases when exceeding the cut-off frequency f1. This cut-off frequency f1 is previously established at a predetermined value to cut off signals which exceed the frequency of the output signals from the acceleration sensor 16 of the air bag expansion standard at the time of an off-set collision.

An output terminal 12B of the first integration circuit 12 is connected to a second input terminal 18B of a first comparison circuit 18. A first input terminal 18A of the first comparison circuit 18 is connected to a terminal ST1 to which a first predetermined voltage Va is supplied as a reference value. Accordingly, the first comparison circuit 18 outputs a high-level signal when an integrated value (voltage), which is outputted from the acceleration sensor 16 and integrated by the first integration circuit 12, exceeds the first predetermined voltage Va.

Figure 4:
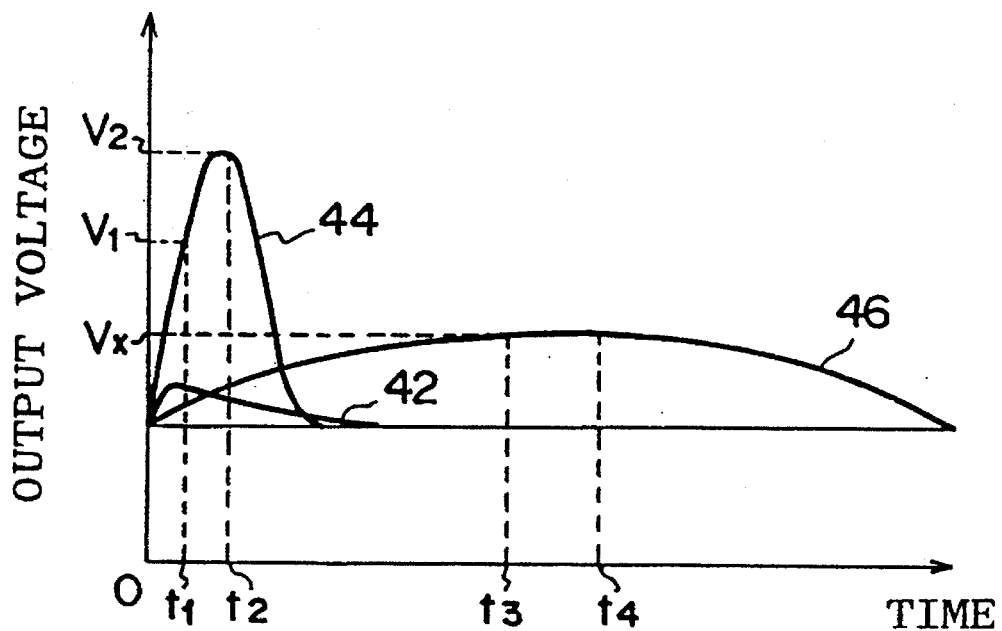
FIG. 4 is a characteristic curve illustrating a time characteristic of an output signal from the first integration circuit.

The predetermined voltage Va supplied to the terminal ST1 corresponds to the voltage between an output voltage V1 and an output voltage V2, respectively at the lower limit time t1 and the upper limit time t2 of the aforementioned air bag expansion time standard at the time of a head-on collision in a curve 44 (see FIG. 4). Curve 44 is the characteristic curve which is obtained by integrating an acceleration signal of the characteristic curve 34 at the time of a vehicle head-on collision in the first integration circuit 12.

An output terminal 14B of the second integration circuit 14 is connected to a second input terminal 20B of a second comparison circuit 20. A first input terminal 20A of the second comparison circuit 20 is connected to a terminal ST2 to which a second predetermined voltage Vb serving as a reference value is supplied. Accordingly, the second comparison circuit 20 outputs a high-level signal when an integrated value (voltage), which is outputted from the acceleration sensor 16 and integrated by the second integration circuit 14, exceeds the second predetermined voltage Vb.

Figure 5:
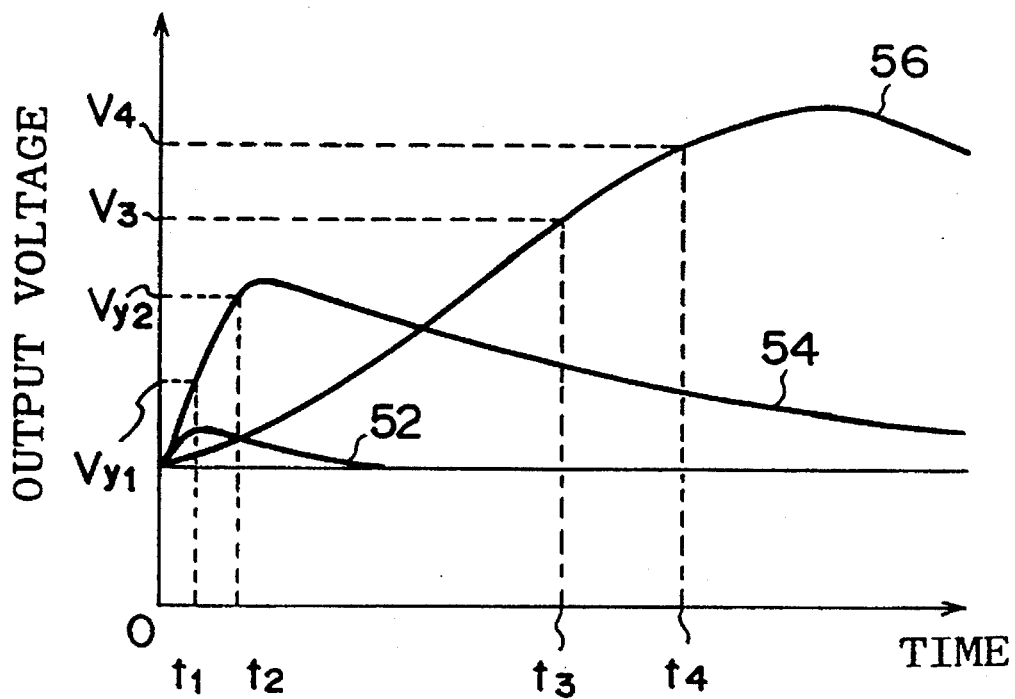
FIG. 5 is a characteristic curve illustrating a time characteristic of an output signal from the second integration circuit.

The predetermined voltage Vb supplied to the terminal ST2 corresponds to the voltage between an output voltage V3 and an output voltage V4, respectively at the lower limit time t3 and the upper limit time t4 of the aforementioned air bag expansion time standard at the time of an off-set collision in a curve 56 (see FIG. 5). Curve 56 is the characteristic curve which is obtained by integrating an acceleration signal of the characteristic curve 36 at the time of an off-set collision in the second integration circuit 14.

An output terminal 18C of the first comparison circuit 18 is connected to a first input terminal 22A of an OR circuit 22. An output terminal 20C of the second comparison circuit 20 is connected to a second input terminal 22B of the OR circuit 22. An output terminal 22C of the OR circuit 22 is connected to an input terminal 24A of an ignition circuit 24. An output terminal 24B of the ignition circuit 24 is connected to a terminal AB. The terminal AB is connected to an ignition device (not shown) for expanding the air bag. When the ignition circuit 24 outputs a signal, the ignition device is actuated to expand the air bag.

The operation of this embodiment will be explained hereinafter.

The output signals from the acceleration sensor 16 are inputted to each of the first integration circuit 12 and the second integration circuit 14 as the same signals.

In the first integration circuit 12, since the gain of the signal exceeding the cut-off frequency f2 decreases as described above (i.e., low pass), the output signal caused by a difference in road level such as a curb is dampened and the output signals at the time of a vehicle head-on collision or an off-set collision are amplified. Thus, the output signals of the acceleration sensor 16, which are shown as characteristic curves 32, 34 and 36 of FIG. 3, are outputted from the first integration circuit 12, as characteristic curves 42, 44 and 46 of FIG. 4, respectively.

The output signal from the first integration circuit 12 and the voltage Va supplied to the terminal ST1 are compared to each other by the first comparison circuit 18. The voltage Va supplied to the terminal ST1 is the voltage between the output voltage V1 and V2 which correspond to the lower limit time t1 and the upper limit time t2, respectively, of the air bag expansion time standard in the curve 44 (see FIG. 4) obtained by integrating the output signal of the acceleration sensor 16 at the time of a vehicle head-on collision by the first integration circuit 12. In addition, the output voltage Vx at the time of an off-set collision is smaller than these voltages V1 and V2. As a result, the first comparison circuit 18 outputs a high-level signal only at the time of a vehicle head-on collision.

Next, in the second integration circuit 14, since the gain of the signal exceeding the cut-off frequency f1 decreases (low pass), the output signal caused by a difference in road level such as a curb and the output signal caused at the time of a vehicle head-on collision are dampened and the output signal caused at the time of an off-set collision is amplified. Thus, the output signals of the acceleration sensor 16 which are shown as characteristic curves 32, 34 and 36 of FIG. 3 are outputted from the second integration circuit 14, as characteristic curves 52, 54 and 56 of FIG. 5, respectively.

The output signal from the second integration circuit 14 and the voltage Vb supplied to the terminal ST2 are compared to each other in the second comparison circuit 20. The voltage Vb supplied to the terminal ST2 is the voltage between the output voltage V3 and V4 which correspond to the lower limit time t3 and the upper limit time t4, respectively, of the air bag expansion time standard in curve 56 (see FIG. 5) obtained by integrating the output signal of the acceleration sensor 16 at the time of an off-set collision by the second integration circuit 14. In this case, the output voltages at the time of a vehicle head-on collision. Vy1 and Vy2, are both smaller than voltages V3 and V4. Accordingly, the second comparison circuit 20 outputs a high-level signal only at the time of an off-set collision.

As a result, high-level signals are outputted from each of the first comparison circuit 18 and the second comparison circuit 20 only at the time of a vehicle head-on collision and an off-set collision, and these output signals are inputted to the OR circuit 22. Then, the OR circuit 22 outputs the logical add of the respective output signals from the first comparison circuit 18 and the second comparison circuit 20, thereby finally allowing the output signal from the OR circuit 22 to be employed, and serving as an expansion signal which is capable of expanding the air bag at the most suitable time in the cases of a vehicle head-on collision and an off-set collision.

Further, when a vehicle rises up due to a difference in road level such as a curb, no high-level signal is outputted from either the first comparison circuit 18 or the second comparison circuit 20. As a result, no signal is outputted from the OR circuit 22 so the air bag is not expanded.

In this way, the construction of the first integration circuit 12 and the first comparison circuit 18, and the construction of the second integration circuit 14 and the second comparison circuit 20 allow an expansion signal which causes the expansion of the air bag for protecting a passenger to be produced at the most suitable time which corresponds only to the time of a vehicle head-on collision or an off-set collision. Furthermore, since neither circuit provides an output signal to expand the air bag when a vehicle rises up due to a difference in road level such as a curb, there is no possibility of outputting signals for erroneously expanding the air bag. Thus, it is possible to make the most suitable determination for expanding the air bag.

In the aforementioned embodiment, three states of a vehicle, i.e., the state in which a vehicle rises up due to a difference in road level such as a curb, the state of a vehicle at the time of a head-on collision, and the state of a vehicle at the time of an off-set collision, have been explained by way of examples. However, the present invention is not limited to these states. For example, the plurality of states of a vehicle may be divided into four or more states in accordance with the states of a vehicle collision and the air bag may be expanded in the respective states. In this case, the present invention may be constructed so as to satisfy the air bag expansion standard by establishing reference voltages each of which corresponds to the respective states, connecting an integration circuit and a comparison circuit to an acceleration sensor in the same way as the aforementioned embodiment, and making a logical operation of these output signals.

Further, in the aforementioned embodiment, a device for expanding an air bag has been explained, which serves as a passenger safety device. However, a retractor with a locking mechanism (that is, an emergency locking retractor) which performs winding and paying out of a webbing may be applicable.

As explained above, the present invention has an effect of being capable of actuating a passenger safety device at the most suitable time irrespective of vehicle conditions or conditions of a vehicle collision.

What is claimed is:

1. An apparatus for determining emergency conditions of a vehicle, comprising:

an acceleration sensor which detects acceleration of a vehicle and outputs a signal that is converted into a waveform;

a plurality of integration means, each of which integrates the signal outputted from said acceleration sensor and uses a different cut-off frequency associated with a time constant corresponding to different kinds of vehicle collision, each said cut-off frequency being set in advance to distinguish between waveforms corresponding to each of said different kinds of vehicle collision;

a plurality of comparison means which respectively correspond to said plurality of integration means and each of which outputs a signal when a signal outputted from a corresponding said integration means exceeds a reference value which is predetermined according to the kind of vehicle collision; and logical operation means which inputs the signals outputted from said plurality of comparison means and outputs a signal for actuating said passenger safety device for protecting a passenger.

2. An apparatus for determining emergency conditions of a vehicle according to claim 1, wherein said plurality of comparison means output signals when the kind of vehicle collision is a head-on collision with another vehicle or a kind where one of the side surfaces of a vehicle has been hit by another vehicle.

3. An apparatus for determining an emergency condition of a vehicle according to claim 1, wherein said plurality of comparison means also output signals to indicate that the vehicle is not in a collision.

4. An apparatus for determining emergency conditions of a vehicle according to claim 1, wherein said logical operation means comprises an OR circuit which outputs an expansion signal for expanding an air bag of an air bag system which serves as the passenger safety device.

5. An apparatus for determining emergency conditions of a vehicle according to claim 1, wherein said logical operation means is connected to an ignition circuit and outputs an expansion signal for expanding an air bag into an air bag system which serves as the passenger safety device through said ignition circuit.

6. An apparatus for determining emergency conditions of a vehicle based on a plurality of different types of vehicle collision, the apparatus comprising:

an acceleration sensor which detects acceleration of a vehicle and outputs a waveform signal in accordance with the type of vehicle collision; and operation-signal generating means for generating an operation signal to actuate a passenger safety device for protecting an occupant of the vehicle, the operation-signal generating means (1) establishing a plurality of signal levels based on the waveform signal output from said acceleration sensor, said signal levels corresponding to said types of vehicle collision, and, depending on the type of vehicle collision, (2) outputting the operation signal to actuate the passenger safety device at a first time relative to said waveform when one of the established signal levels corresponding to one of the types of vehicle collision exceeds one reference value corresponding to said one type of vehicle collision, and (3) outputting the operation signal to actuate the passenger safety device at a second time relative to said waveform, which occurs at a time that is later than the first time, when another of the established signal levels corresponding to another of the types of vehicle collision exceeds another reference value corresponding to said another type of vehicle collision.

7. An apparatus for determining emergency conditions of a vehicle in accordance with claim 6, wherein said one signal level corresponds to a head-on collision and said another of said signal levels corresponds to an off-set collision.

8. An apparatus for determining emergency conditions of a vehicle according to claim 6, wherein said operation-signal generating means includes an integration circuit for integrating the signal outputted from said acceleration sensor and a comparison circuit for comparing a signal from said integration circuit with said one reference value.

9. An apparatus for determining emergency conditions of a vehicle according to claim 6, wherein said operation-signal generating means includes a plurality of circuits corresponding to said types of vehicle collision, the number of said circuits corresponding to the number of types of vehicle collision, and wherein said operation-signal generating means establishes a signal level for each circuit.

10. An apparatus for determining emergency conditions of a vehicle according to claim 6, wherein said operation signal is an expansion signal for expanding an air bag of an air bag system which serves as said passenger safety device.

11. An apparatus for determining emergency conditions of a vehicle according to claim 6, wherein said operation signal is a signal for locking a webbing of a retractor by a locking mechanism which winds and pays out a webbing which serves as said passenger safety device.

12. An apparatus for determining emergency conditions of a vehicle, comprising:

an acceleration sensor which detects acceleration of a vehicle and outputs a signal including a waveform;

a plurality of integrators, each integrator having associated therewith a different cut-off frequency associated with a time constant according to different kinds of vehicle collision, each said cut-off frequency being set in advance to distinguish between waveforms corresponding to each of said different kinds of vehicle collision by amplifying selected waveforms and suppressing unselected waveforms, the integrators integrating the signal outputted from said acceleration sensor and using said different cut-off frequencies associated with said time constants; and comparison circuitry that outputs a signal to actuate said passenger safety device to protect a passenger when a signal outputted from one of said integrators exceeds a corresponding reference value that is predetermined according to the kind of vehicle collision, and that outputs a signal to actuate said passenger safety device to protect a passenger when a signal outputted from another one of said integrators exceeds a corresponding reference value that is predetermined according to a different kind of vehicle collision.

13. An apparatus for determining emergency conditions of a vehicle according to claim 12, wherein said plurality of integrators each comprises a low-pass filter, an amplification factor of which decreases at a frequency equal to or greater than a predetermined frequency.

14. An apparatus for determining emergency conditions of a vehicle according to claim 12, wherein said integrators integrate the signal from said acceleration sensor based on different time constants according to the kind of vehicle collision and generate signals exceeding the predetermined reference values only at the time of vehicle collision.

15. An apparatus for determining emergency conditions of a vehicle according to claim 12, wherein said comparison circuitry comprises a computer that compares the signals outputted from said integrators with the predetermined reference values.

16. An apparatus for determining emergency conditions of a vehicle according to claim 12, wherein said comparison circuitry comprises a plurality of comparison circuits and establishes a different predetermined reference value for each of said plurality of comparison circuits.

17. An apparatus for determining emergency conditions of a vehicle according to claim 12, wherein said comparison circuitry outputs an expansion signal which causes the expansion of an air bag of an air bag system which serves as the passenger safety device.

18. An apparatus for determining emergency conditions of a vehicle according to claim 12, wherein said comparison circuitry outputs a signal for locking a webbing of a retractor with a locking mechanism which winds and pays out a webbing which serves as the passenger safety device.

19. An apparatus for activating an occupant safety device of a vehicle upon collision of the vehicle, the apparatus comprising:

a single acceleration sensor connected with the vehicle to detect acceleration of the vehicle and to output an acceleration waveform signal; and circuitry connected with the single acceleration sensor to (1) determine based on the acceleration waveform signal whether the vehicle collision is a head-on collision and to issue an activation signal to activate an occupant safety device at a first time relative to said waveform signal when the vehicle collision is said head-on collision, and (2) determine based on the acceleration signal whether the vehicle collision is an off-set collision and to issue an activation signal to activate said occupant safety device at a second time relative to said waveform signal, which occurs at a time that is later than the first time, when the vehicle collision is said off-set collision.

20. An apparatus according to claim 19, wherein said circuitry comprises:

a first integrator for integrating the acceleration signal and generating a first signal;

a first comparator for comparing the signal from the first integrator with a first predetermined reference value and generating a signal indicative of said head-on collision;

a second integrator for integrating the acceleration signal and generating a signal; and a second comparator for comparing the signal from the second integrator with a second predetermined reference value and generating a signal indicative of said off-set collision.

* * * * *